(12) United States Patent
Duchemin et al.

(10) Patent No.: US 7,810,630 B2
(45) Date of Patent: Oct. 12, 2010

(54) ARRANGEMENT FOR THE DISTRIBUTION OF PRODUCTS ON A HIGH-SPEED CONVEYOR BELT

(75) Inventors: Guillaume Duchemin, Octeville sur Mer (FR); Christophe Poupon, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 32 days.

(21) Appl. No.: 12/438,577

(22) PCT Filed: Aug. 14, 2007

(86) PCT No.: PCT/EP2007/058398

§ 371 (c)(1),
(2), (4) Date: Feb. 24, 2009

(87) PCT Pub. No.: WO2008/022940

PCT Pub. Date: Feb. 28, 2008

(65) Prior Publication Data

US 2010/0012463 A1    Jan. 21, 2010

(30) Foreign Application Priority Data

Aug. 24, 2006  (FR) .................................. 06 53447

(51) Int. Cl.
*B65G 47/26* (2006.01)
(52) U.S. Cl. ................... 198/457.06; 198/426; 198/441
(58) Field of Classification Search ................. 198/426, 198/430, 441, 475.06, 457.07, 456
See application file for complete search history.

(56) References Cited

U.S. PATENT DOCUMENTS

| 2,881,575 | A | * | 4/1959 | Day et al. ................. 198/426 |
| 3,880,301 | A | * | 4/1975 | Reilly ...................... 198/426 |
| 4,498,576 | A | | 2/1985 | Anderson |
| 5,359,875 | A | * | 11/1994 | Sova ....................... 198/426 |
| 6,854,587 | B2 | * | 2/2005 | Handel et al. ........... 198/457.07 |
| 6,962,250 | B2 | * | 11/2005 | Van Liempd et al. ... 198/457.06 |

FOREIGN PATENT DOCUMENTS

| DE | 255425 | 1/1912 |
| DE | 31 16 991 | 11/1982 |
| DE | 39 16 424 | 11/1990 |
| DE | 10 2004 015 969 | 10/2005 |
| EP | 0 395 178 | 10/1990 |
| EP | 1 260 467 | 11/2002 |
| GB | 765013 | 1/1957 |

OTHER PUBLICATIONS

French Search Report dated Apr. 2, 2007, from corresponding French application.

* cited by examiner

*Primary Examiner*—James R Bidwell
(74) *Attorney, Agent, or Firm*—Young & Thompson

(57) ABSTRACT

An arrangement for the distribution of products (Pn) includes a distribution device consisting of a phaser (23) that includes two belts (50, 52) driven independently and each comprising at least one cam (60) driven at a deflecting speed and selectively controlled in an operation mode for, according to a predetermined distribution sequence, contacting at least one product (Pn) of a first queue (F1) in order to deflect laterally the product (Pn) from an initial position to a determined final position which is transversally offset relative to the initial position so as to form at least a second queue of products (Pn) parallel or orthogonal to the first queue.

20 Claims, 6 Drawing Sheets

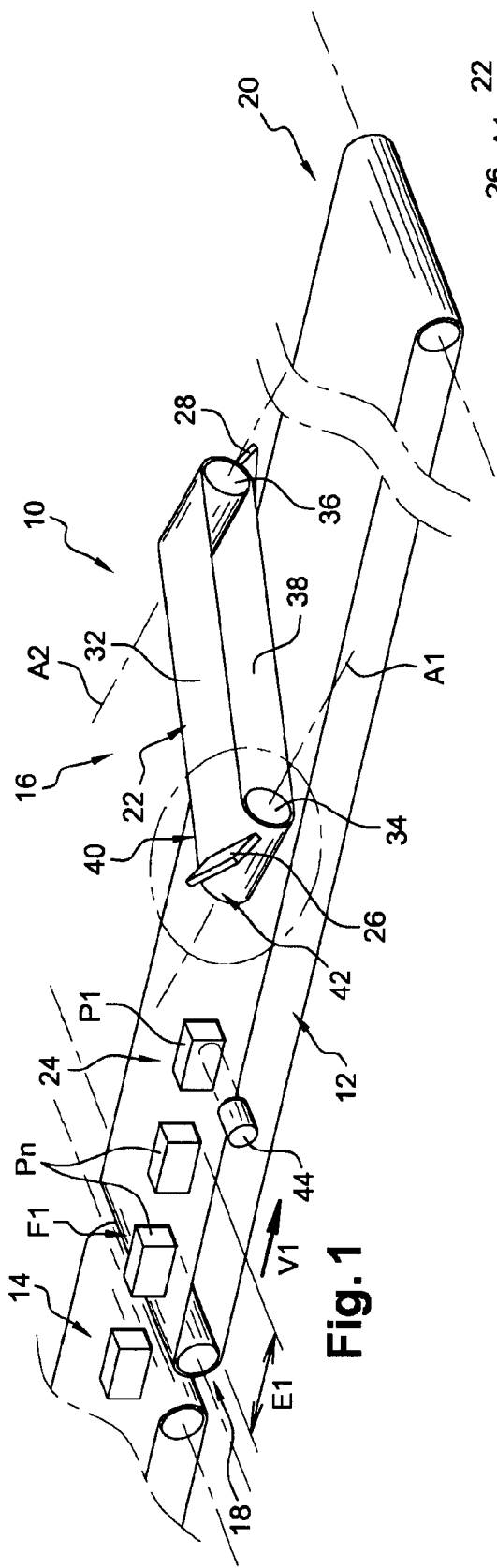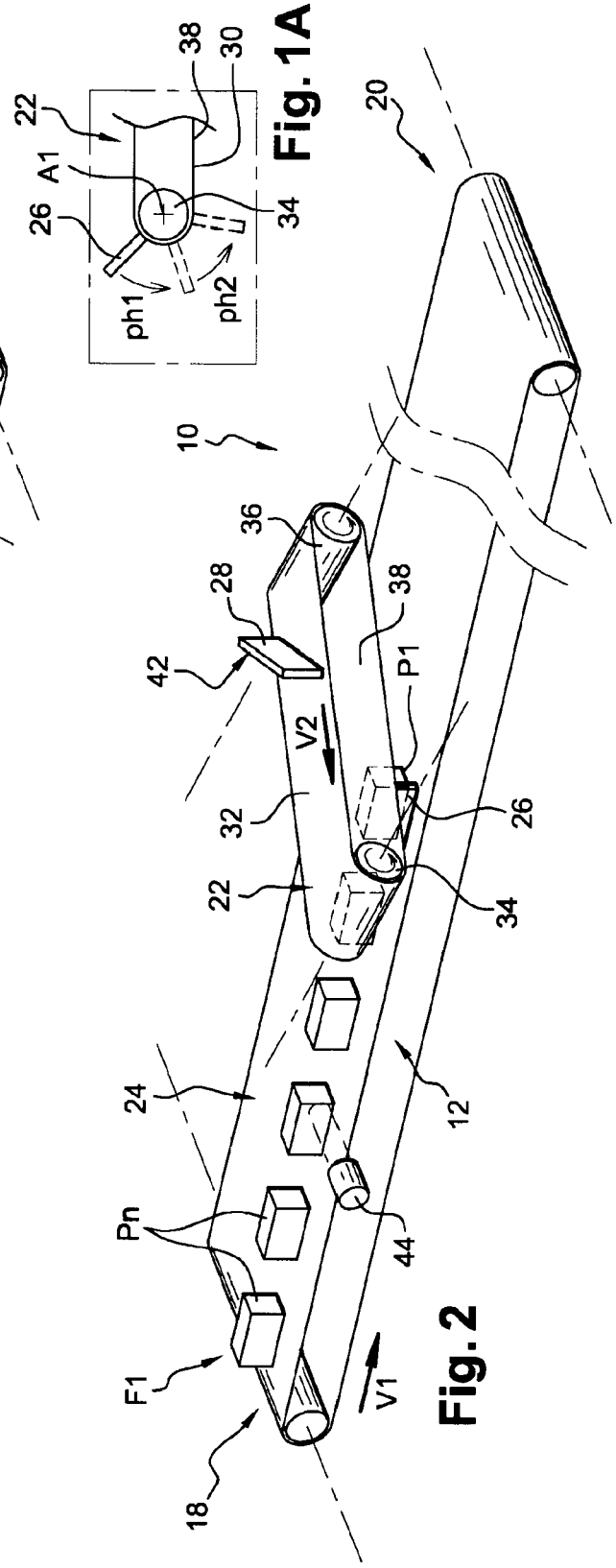

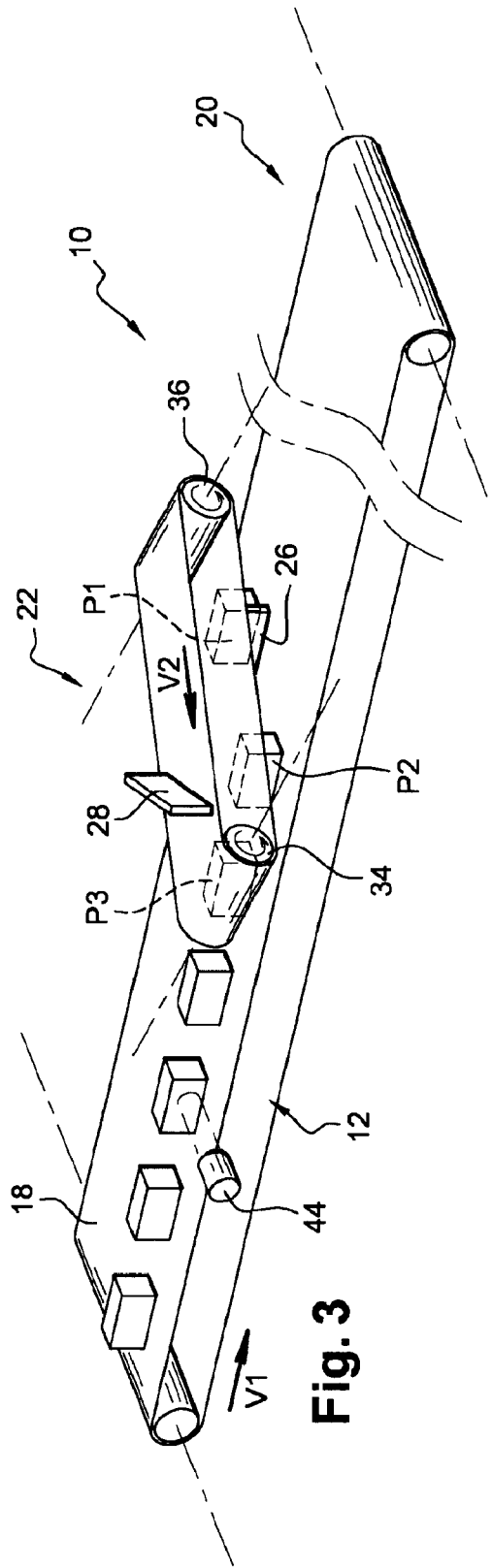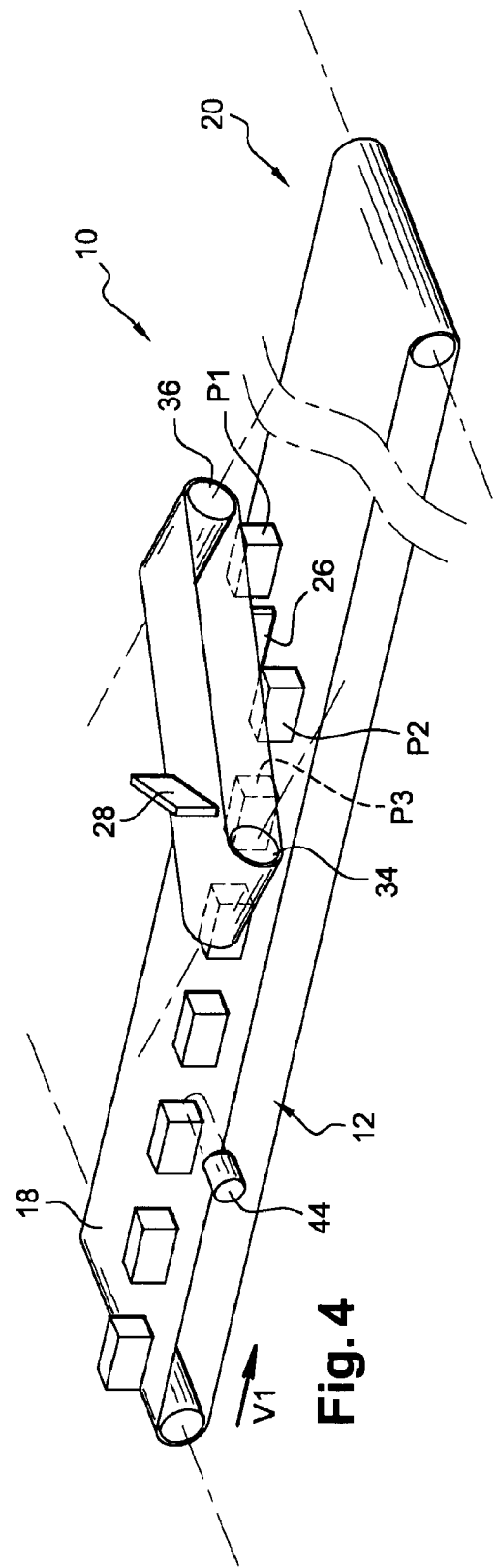

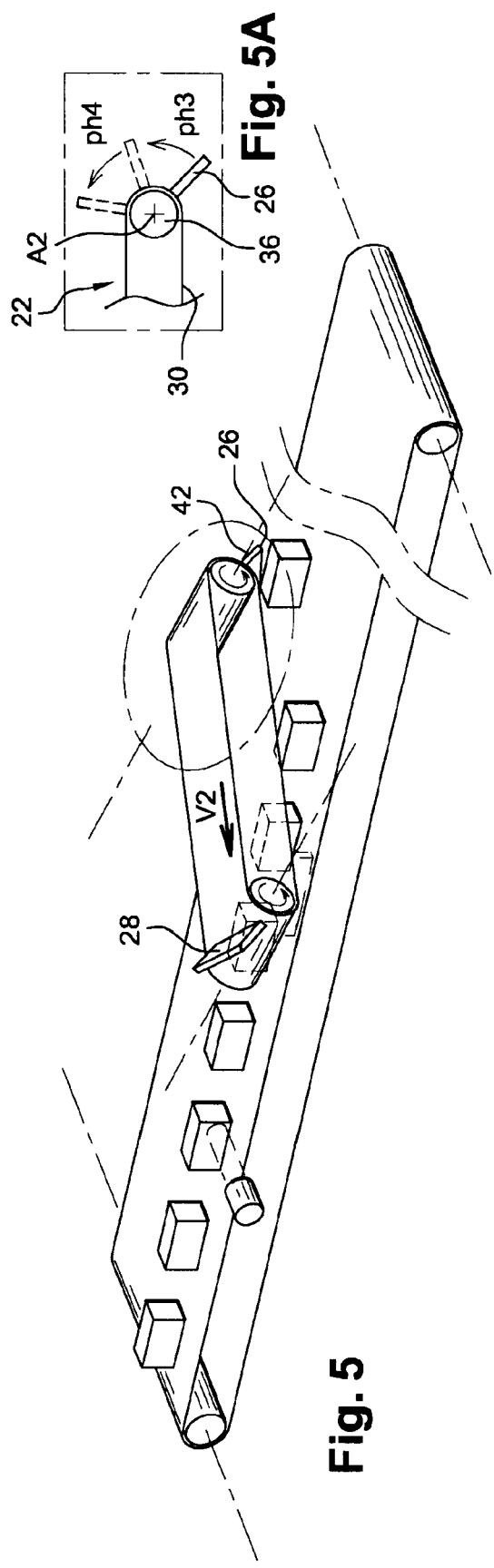
Fig. 5
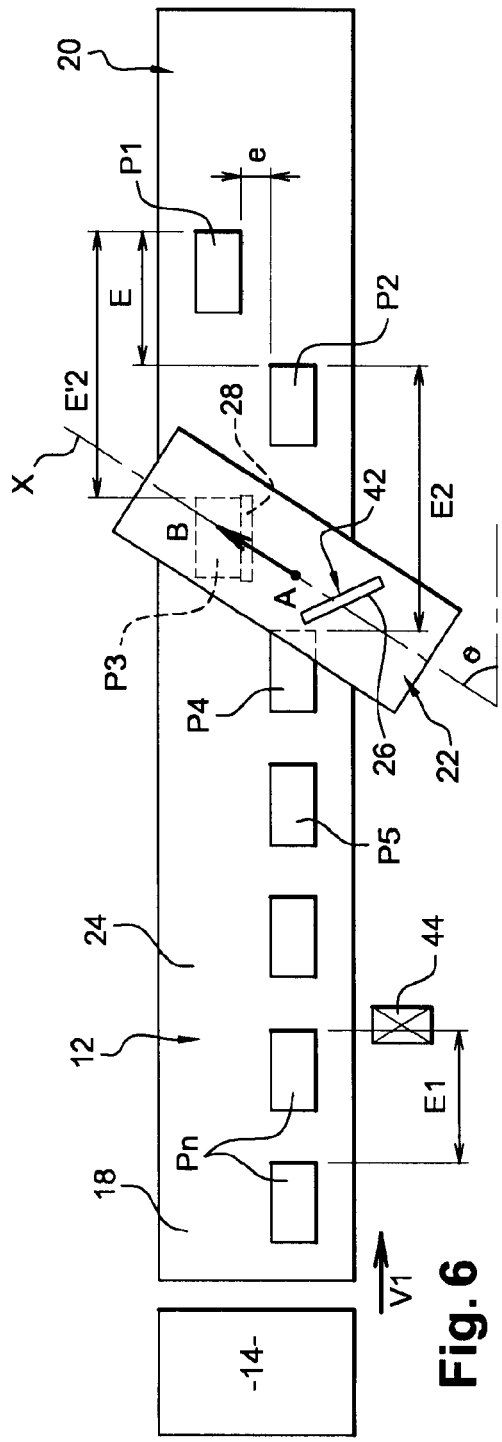
Fig. 5A
Fig. 6

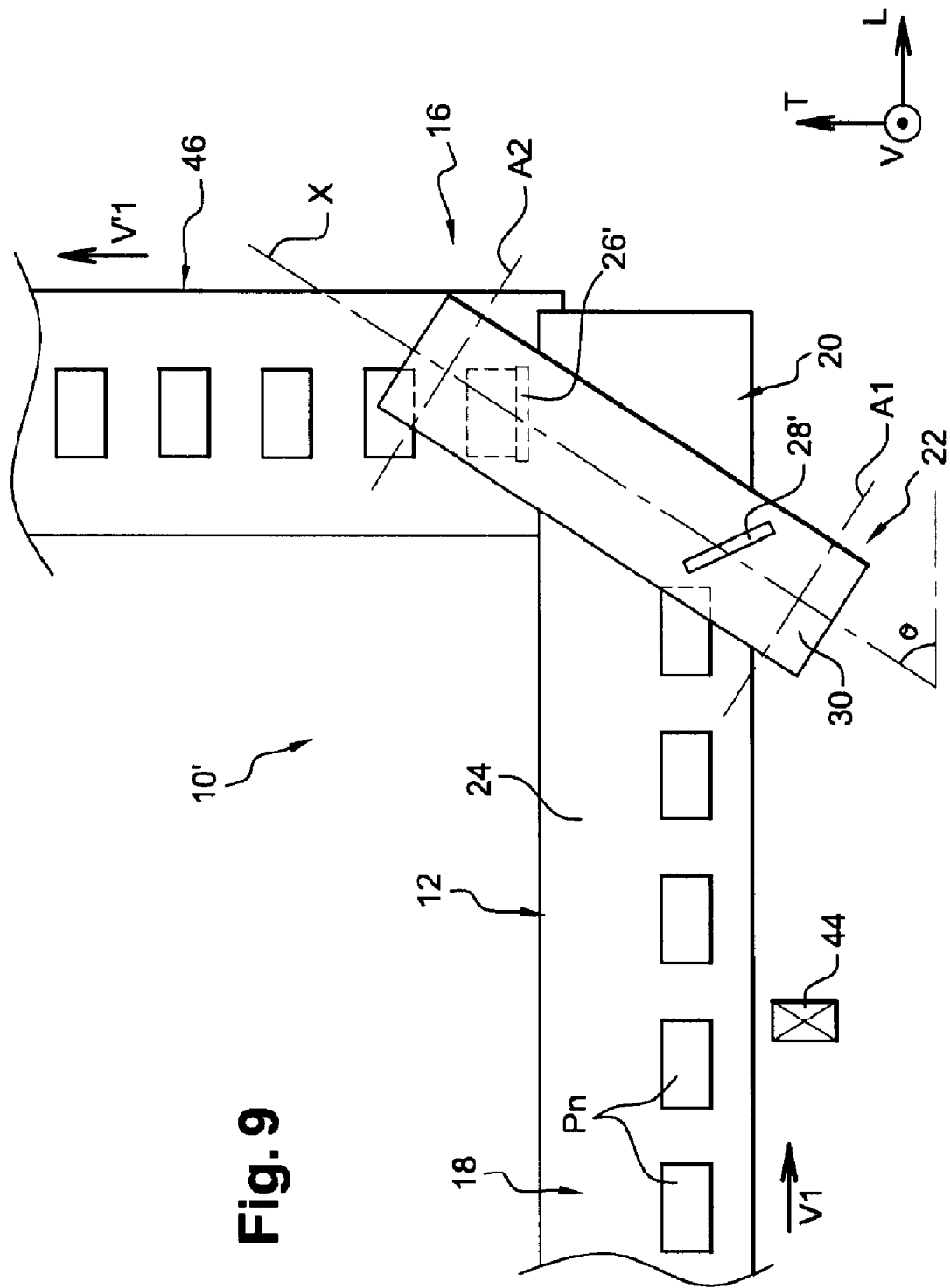

ARRANGEMENT FOR THE DISTRIBUTION OF PRODUCTS ON A HIGH-SPEED CONVEYOR BELT

The invention relates to an arrangement for the distribution of products on a high-speed conveyor belt.

The invention relates more particularly to an arrangement for the distribution of products, in which the products are transported on a conveyor belt which runs in a longitudinal direction, from an upstream entry area to a downstream exit area, at a determined so-called running speed, in which the products form, in the entry area, at least one longitudinal queue, called first queue, with a determined upstream spacing between two successive products, and which comprises at least one distribution device, called deflector, consisting of a phaser which, arranged between the entry area and the exit area on the path of the products, is designed to deflect at least a portion of the products according to a determined distribution sequence, the phaser comprising at least one cam which is driven at a deflection speed and which is able to come into contact with at least one product of the first queue to laterally deflect said product from an initial position to a determined final position, transversally offset relative to the initial position, so as to form at least one second queue of products.

This type of arrangement is, in particular, used in product packaging installations, for example in installations comprising a conveyor line designed to route products to a crating machine, the crating machine stacking batches of products in crates or in packaging boxes.

The conveyor line generally comprises, upstream of the crating machine, a conveyor belt which transports the products, with a determined spacing between two consecutive products, to a product grouping device, also called "grouper", which comprises a series of moving transport cells.

The grouper presents, facing the belt, an empty cell designed to receive a determined number of products which are stacked in the cell so as to form a batch.

When a batch is formed in the cell, the latter is moved by one notch to enable the grouper to present a new empty cell facing the belt.

The cells are thus offset progressively, notch by notch, which makes it possible to route the batches of products to the crating machine.

To facilitate and speed up the filling of the cells, it is known to form the batches of products upstream of the grouper, by means of a phasing device, also called "phaser".

The arrangement usually comprises, upstream of the phaser, a distribution device, also called "deflector", designed to deflect the products so as to produce in particular a split queue by forming a second parallel queue of products.

Known from the state of the art are numerous distribution devices, such as deflectors of the needle or drawer type.

A needle deflector comprises a deflection element, called "needle", which is mounted pivoting at one of its ends around a vertical axis and which is likely to pivot between at least two extreme positions, respectively a first position in which the needle deflects at least one product to a first queue and a second position in which the needle deflects at least one product to a second queue.

When the products arrive on a conveyor belt, arranged in a longitudinal queue and with a determined upstream spacing between two successive products, the needle of the deflector will, depending on its position, transversally deflect one or more products, to offset them laterally relative to the initial longitudinal queue.

In the case of an application in which the distribution sequence corresponds to an alternating cycle for deflecting one product out of two, that is one product to a first queue then the next product to a second queue, it is necessary for a needle deflector, as for a drawer deflector, to allow for the automatic treatment of the products so that the products present between them a determined upstream spacing, the value of which, which is constant, corresponds to a minimum set-point value.

The minimum set-point value of the upstream spacing is determined according to the deflector, for example by adding on the one hand the length of the needle or of the drawer in the longitudinal running direction of the products and, on the other hand, a path length which is dependent on the running speed of the products and which corresponds to the switching time needed for each of the deflectors to pass from one position to another.

Such deflectors are in particular not capable of selectively treating a queue of products to be distributed or deflected, that is to say they are not able to treat the products if they do not present between them a determined upstream spacing of constant value greater than or equal to a minimum set-point value.

Now, it is commonplace in product packing installations for the products to present deviations relative to the upstream spacing value, in particular because of the use of conveyor belts or else devices for detecting and eliminating defective products.

Such devices for detecting and eliminating defective products, for example because of the nonconformity of their weight, cause "holes" in the queue because of the absence of eliminated products.

Consequently, an installation comprising such a device for detecting and eliminating defective products generally requires the implementation of other specific means, such as timing belts, to feed the deflector with products with an even spacing between them.

Furthermore, needle deflectors, like drawer deflectors, do not make it possible, because of their design and their operation, to treat products at very high speed, for example at speeds of more than 900 products per minute.

Also known from the state of the art are distribution devices, generally called paddle deflectors, such as those described and represented in the arrangements for product distribution in document DE-A1-31.16991 or document EP-A1-0.395.178.

Each of these documents also describes an exemplary application of such paddle deflectors, more specifically document DE-A1-31.16991 illustrates a queue splitting case whereas document EP-A1-0.395.178 illustrates a 90° product deflection case.

However, the distribution devices described in these documents are also not capable of selectively treating a queue of products to be distributed or deflected, that is to say are not able to treat the products if they do not present between them a determined upstream spacing of constant value greater than or equal to a minimum set-point value.

Consequently, the use of such paddle deflectors requires the implementation of other specific means upstream to feed the deflector with products with even spacing between them.

The invention aims in particular to remedy these drawbacks by proposing a simple, cost-effective and effective solution making it possible in particular to deflect products at high speed and which, in addition, are not necessarily evenly spaced apart.

To this end, the invention proposes an arrangement of the type described previously, characterized in that the phaser comprises a first and a second similar belt which are arranged in parallel and which are driven independently, and in that each belt is controlled in an active operating state before the end of the active state of the other belt, so that the deflection of a product begins before the previously deflected downstream product has reached its final position in the second queue.

According to other characteristics of the invention:

the phaser is selectively controlled, according to said distribution sequence, in order for the cam to occupy at least:
- a first engaged position in which the cam comes laterally into contact with the product occupying the initial position so as to transversally deflect said product from the first queue, and
- a second engaged position in which, said deflected product occupying the final position in the second queue, the cam is immobilized so as to enable the deflected product to continue its movement;

each drive belt of the phaser bears at least one cam and is arranged alongside the top face of the belt, each belt is wound on at least two drive pulleys so that a bottom strand of the belt extends substantially parallel to the top face of the belt, the cam occupying the first and second engaged positions when it is situated on the bottom strand, and the phaser comprises means for driving the pulleys rotation-wise at the determined deflection speed;

the phaser comprises a main axis parallel to the belt which is inclined forward so as to form, with the longitudinal running direction of the products on the conveyor belt, a determined angle the value of which is between 0° and 90°;

the cam is positioned on the belt so as to vertically present a lateral deflection face, which is designed to come into contact with the product to be deflected and which extends parallel to the longitudinal running direction of the products of the first queue on the conveyor belt;

the cam is controlled from its second engaged position to at least one retracted waiting position, when having reached its final position in the second queue, the deflected product is no longer transversally in contact with the lateral deflection face of the cam;

the belt comprises a passive operating state in which it is stopped, each cam occupying the second engaged position or the retracted waiting position, and the active operating state in which the belt is driven rotation-wise around the pulleys so that a cam is moved generally transversally from the retracted waiting position to the second engaged position or from the second engaged position to the retracted waiting position;

the belt is controlled in its active state through the intermediary of detection means, such as a sensor, positioned upstream of the phaser and able to supply a detection signal for a product which can be used according to the determined distribution sequence to deflect the products to the second queue;

when the two belts are in the passive state, the retracted positions of the cams of the first belt are offset relative to the retracted positions of the cams of the second belt, so as to prevent crossing of the cams of the two belts and in that each belt bears at least two similar cams which are evenly spaced along the belt so that, for each belt, just one cam at a time can occupy the first engaged position;

the second queue comprising the deflected products is parallel to the first queue;

in the engaged position, the belt is driven at a determined deflection speed so that the longitudinal driving speed of the cam is equal to the running speed;

the second queue comprising the deflected products is orthogonal to the first queue.

Other characteristics and advantages of the invention will become apparent from reading the detailed description that follows, for an understanding of which reference can be made to the appended drawings in which:

FIG. 1 is a perspective view which diagrammatically represents an arrangement comprising a phaser according to a first embodiment and which illustrates a first exemplary application in which the second queue of deflected products is parallel to the first queue;

FIG. 1A is a side view which represents in detail the first cam between the retracted waiting position and the first engaged position;

FIG. 2 is a perspective view, similar to FIG. 1, which represents the first engaged position of the cam corresponding to the initial position A of the product and to an active operating state of the phaser;

FIG. 3 is a perspective view which represents the second engaged position of the cam corresponding to the final position B of the product;

FIG. 4 is a perspective view which represents the cam temporarily stopped in its second engaged position corresponding to a passive operating state of the phaser to enable the deflected product to be released;

FIG. 5 is a perspective view, identical to FIG. 1, which illustrates the second cam in the retracted waiting position, corresponding to a passive operating state of the phaser;

FIG. 5A is a side view which represents in detail the first cam between the second engaged position and the retracted return position;

FIG. 6 is a top view which represents the arrangement according to FIGS. 1 to 5 and which illustrates the exemplary staggered sequence for distributing one product out of two;

FIG. 9 is a top view which diagrammatically represents an arrangement comprising a phaser according to the first or second embodiment and which illustrates a second exemplary application in which the second queue of deflected products is orthogonal to the first queue.

Figure 7:
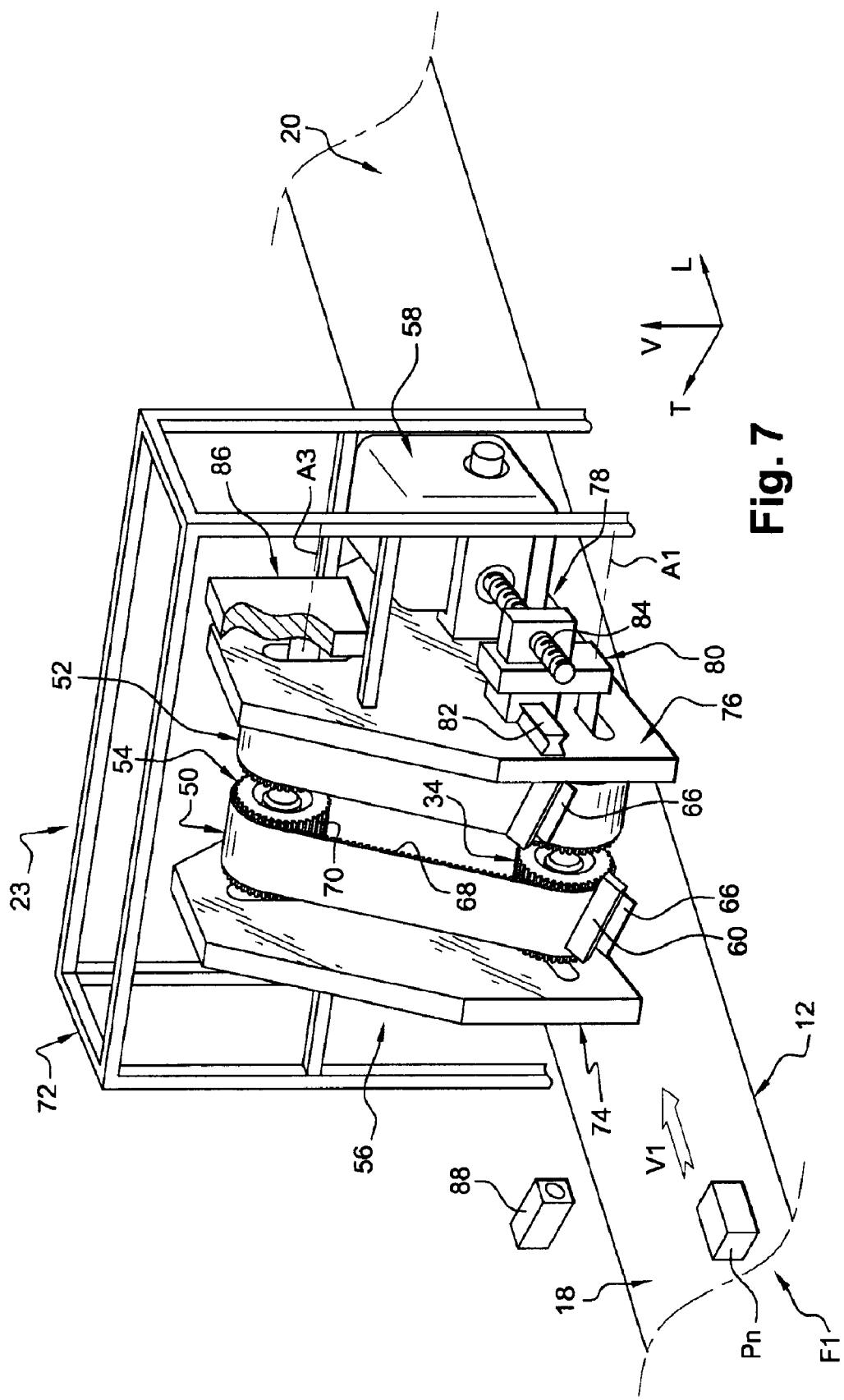
FIG. 7 is a perspective view which diagrammatically represents a second embodiment of a phaser equipped with a first and a second parallel belt.

For the description of the invention, the longitudinal, vertical and transversal orientations according to the L, V, T marker indicated in the figures will be adopted in a non-limiting way.

In the description that follows, identical, similar or analogous elements will be designated by the same reference numerals.

FIG. 1 diagrammatically represents an arrangement 10 for the distribution of products Pn.

The arrangement 10 comprises a conveyor belt 12 which runs in a longitudinal direction oriented from upstream to downstream, which generally corresponds to an orientation from left to right in the perspective FIG. 1.

The arrangement 10 comprises a feed device 14, such as a belt, which is designed to feed the conveyor belt 12 with products Pn and a distribution device 16, called deflector.

The belt 12 is driven at a substantially constant running speed V1 so that the belt 12 routes the products Pn from an entry area 18 situated upstream to an exit area 20 situated downstream.

In the entry area 18, the products Pn form a longitudinal queue, called first queue F1 of products Pn, in which two successive products Pn are separated by a determined upstream spacing E1.

Advantageously, the upstream spacing E1 between two consecutive products is greater than or equal to a determined minimum set-point value.

Hereinafter in the present description, a "spacing" corresponds by definition to the longitudinal distance between the downstream end of a first product of a given queue and the downstream end of a second product situated immediately upstream on one and the same queue or another queue, in particular parallel to that of the first product.

Consequently, and as can be seen in FIG. 1, the spacing E1 corresponds to the distance between the downstream vertical face of a product Pn and the downstream vertical face of the upstream product Pn+1 directly succeeding it.

A distribution device 16 is arranged, between the entry area 18 and the exit area 20, on the path of the products Pn so as to deflect all or some of the products Pn according to a determined distribution sequence.

In the first exemplary application represented in FIGS. 1 to 6, the distribution sequence is in this case a staggered distribution with an alternation of one product Pn out of two as can be seen in the top view in FIG. 6.

Obviously, the distribution sequence represented is given purely by way of non-limiting example so that the distribution could, as a variant, be one product out of "n" products, with n=3, n=4, etc.

Furthermore, the invention is also not limited to the deflection of a product as a single element so that the distribution device is also capable of deflecting a set of several products such as a batch.

Advantageously, the distribution device 16 consists of at least one phaser 22 or 23 (see FIG. 7) which is selectively controlled so as to transversally deflect one product Pn out of two from the first queue F1 to form a second longitudinal queue F2, parallel to the first queue F1.

The phaser 22 is arranged above the top horizontal surface 24 on which the products Pn run and between the entry area 18 and the exit area 20.

The phaser 22 comprises at least one cam 26 which is driven at a deflection speed V2 and which is controlled, according to said distribution sequence, in order to come selectively into contact with at least one product Pn of the first queue F1 to laterally deflect said product Pn from an initial position A to a determined final position B, which is transversally offset relative to the initial position A, so as to form at least one second queue F2 of products Pn.

A first embodiment of the phaser 22 forming the distribution device 16 according to the invention is represented, in the first exemplary application illustrated in FIGS. 1 to 6.

According to this first embodiment, the phaser 22 comprises a belt 30 which is arranged alongside the top face 24 of the belt 12 and which is capable of driving to displace at least one cam 26.

Advantageously, the belt 30 of the phaser 22 here comprises a first cam 26 and a second cam 28. As a variant, the phaser 22 comprises more than two cams on the belt 30.

The belt 30 bears, on its external face 32, the first cam 26 and the second cam 28 which are arranged at positions that are substantially opposite according to the direction of the longest length of the belt 30.

The first cam 26 and the second cam 28 are in this case similar and consist, for example of elements in the form of parallelepipedal plates.

Obviously, the shape and the materials used in order to manufacture the cams 26, 28 can vary, notably according to the type of product Pn to be treated.

As a variant, the cams present, in cross section through a generally horizontal plane, a "V", "U" or even "L" shape, arranged on the belt 30 with a determined inclination forwards so as to enable the product to be released in the direction of the second queue F2.

The belt 30 is wound on a first pulley 34, called upstream pulley, and on a second pulley 36, called downstream pulley, which are capable of being driven rotation-wise respectively around a first rotation axis A1 and a second rotation axis A2.

The phaser 22 comprises a main axis X which is parallel to the bottom strand 38 of the belt 30 and which is orthogonal to the axes A1 and A2 of the pulleys 34 and 36.

According to a first important characteristic of the invention, the main axis X is inclined forward so as to form a determined angle θ with the longitudinal running direction of the products Pn on the conveyor belt 12.

Advantageously, the value of the angle θ is between 0° and 90°, preferably equal to 30°, 45° or 60°.

The bottom strand 38 of the belt 30 extends substantially parallel to the top face 24 of the belt 12 at a height that is determined according to the cams 26, 28 and the products Pn.

The phaser 22 comprises driving means, such as a servomotor 40, able to drive the pulleys 34, 36 rotation-wise at the determined deflection speed V2.

According to a second important characteristic of the invention, the belt 30 is driven at a deflection speed V2 which is determined so that the longitudinal driving speed VL of the cam 26, 28 is equal to the running speed V1 of the products Pn.

Advantageously, the longitudinal speed VL is zero when the value of the angle θ is equal to 90°.

Thus, the products Pn deflected by the phaser 22 are not stopped or slowed down during the distribution operation, which makes it possible to maintain a running speed V1 for each product Pn, deflected or otherwise, and thus to obtain high-speed distribution according to the desired distribution sequence between the first queue F1 and the second queue F2.

Preferably, the cams 26 and 28 are positioned on the belt 30 so as to each present vertically, when they are located on the bottom strand 38, a lateral deflection face 42 which extends parallel to the longitudinal running direction of the products Pn on the conveyor belt 12.

The cams 26, 28 therefore present an inclination relative to the belt 30 which corresponds to the value of the inclination of the main axis X of the phaser 22 relative to the belt 12, or the angle θ. As a variant, the cams 26, 28 present an orientation of the lateral face 42 that is different from the longitudinal orientation.

The lateral deflection face 42 of the cams 26, 28 is designed to come laterally into contact with the product Pn to be deflected in order to exert on the latter a thrust force, called deflection force, preferably mainly in the transversal direction.

The cams 26, 28 of the phaser 22 are selectively controlled between at least one first engaged position and a second engaged position.

The phaser 22 comprises respectively an active operating state in which the belt 30 drives cams 26, 28 displacement-wise and a passive operating state in which the belt 30 and the cams 26, 28 are no longer driven.

Advantageously, the belt 30 is selectively controlled in its active state or in its passive state according to signals emitted by detection means 44, such as a sensor and/or a coder, which are positioned upstream of the phaser 22 and which are capable of detecting the arrival of a product Pn on the belt 12.

The sensor 44 comprises, for example, an electric cell that is arranged at the edge of the belt 12 and which is electrically linked to the servomotor 40, so that the detection of a product triggers, according to the determined distribution sequence, the starting-up of the servomotor 40 at the appropriate instant.

It will be noted that the arrangement 10 according to the invention can be equipped with a coder (not represented) which accurately measures the distance traveled by the belt 12 from the detection signal for a product Pn emitted by the sensor 44.

Thanks to the coder, the longitudinal position relative to the phaser 22 of the product Pn detected by the sensor 44 is accurately known, which ensures that the servomotor 40 will be triggered at the appropriate instant.

The value of the upstream spacing E1 between two longitudinally aligned consecutive products is determined so as to be greater than or equal to a minimum set-point value which is in particular dependent on the characteristics of the phaser 22, such as the number of cams, the length of the belt 30 or the center-to-center distance A1-A2, etc.

Advantageously, since the phaser 22 is selectively controlled according to the detection signal, it is therefore capable of treating a queue comprising products with an upstream spacing E1 that is not necessarily constant or even.

This characteristic is particularly useful to allow for a reliable operation of the arrangement 10 according to the invention at high speed.

There now follows a description more particularly of the operation of the phaser 22 according to the first embodiment in the case of the first exemplary application represented in FIGS. 1 to 6.

In FIG. 1, the belt 30 of the phaser 22 is initially in a passive operating state in which it is stopped whereas the first cam 26 is in a first retracted position, called waiting position, and the second cam 28 is in a second retracted position, called return position.

As a variant, when the first cam 26 is in the first retracted waiting position, the second cam 28 is in the second engaged position so that the second retracted return position constitutes an optional intermediate position, notably used or not according to the rate.

As can be seen in FIG. 1, the products Pn run on the top surface 24 of the belt 12 at the running speed V1 and are longitudinally aligned in a first queue F1 of products Pn, with a determined upstream spacing E1 between two successive products Pn positioned one behind the other.

The sensor 44 detects the arrival of a first product P1 and consequently emits a corresponding detection signal, said signal provoking the starting-up of the servomotor 40 in order for the belt 30 of the phaser 22 to pass from its passive state to its active state.

The change of state of the belt 30 provokes the driving of the first cam 26 which passes from its retracted waiting position to its first engaged position, as is represented in FIG. 2.

Advantageously, when the belt 30 passes from the passive state to the active state, the starting-up of the servomotor 40 comprises a prior acceleration phase ph1, which enables the belt to pass from a zero speed to the deflection speed V2.

Preferably, the retracted waiting position is chosen so that the first cam 26 reaches an intermediate engagement position at the end of the acceleration phase ph1, before it has reached its first engaged position.

As an aid to understanding, FIG. 1A represents in detail a side view of the phaser 22 illustrating the different phases and the corresponding positions of the first cam 26 around the pulley 34 of rotation axis A1.

In FIG. 1A, the retracted waiting position of the first cam 26 is represented by a thick line, the intermediate engagement position by a thin broken line and the first engaged position by a thick broken line.

The displacement phase of the first cam 26 between the intermediate engagement position and the first engaged position is called engagement phase ph2.

The triggering instant of the servomotor 40 is aligned relative to the signal emitted by the sensor 44, so the first cam 26 comes, synchronously, laterally into contact with at least one product, in this case the first product P1, from the first engaged position.

Thus, when the first cam 26 occupies its first engaged position, the first product P1 simultaneously occupies its initial position A so as to be transversally deflected by the first cam 26 out of the first longitudinal queue F1.

The belt 30 is driven rotation-wise by the servomotor 40 around pulleys 34, 36 with the determined deflection speed V2 so that the first cam 26 is displaced generally transversely with the deflected product P1 at a longitudinal speed VL equal to the running speed V1.

Advantageously, the first product P1 deflected by the cam 26 retains a constant displacement speed and a relative position on the belt 12 which is identical relative to the other products Pn.

As can be seen by comparison between FIGS. 2 and 3, the first cam 26 is displaced from the first engaged position to a second engaged position, which is reached when the first product P1 simultaneously occupies its final position B in the second queue F2.

As illustrated in FIG. 6, the deflected product P1 travels, from its initial position A to its final position B in the second queue F2, a substantially rectilinear oblique path.

The second product P2 situated upstream is detected by the sensor 44 but continues, according to the distribution sequence, its longitudinal displacement in the first queue F1 without being deflected.

The distance traveled by the first deflected product P1 determines the transversal distance or separation distance "e" between the first queue F1 and the second queue F2.

The first product P1 reaches its final position B when the first cam 26 reciprocally reaches its second engaged position.

Advantageously, the first cam 26 having reached the second engaged position, the belt 30 temporarily ceases to be driven and passes to the passive state so as to enable the deflected product P1 to continue its longitudinal displacement in the second queue F2, parallel to the first queue F1.

As a variant that is not represented, the arrangement 10 comprises guidance means, such as a slider or a rail, arranged laterally on the side of the belt 12 above the surface 24 so as to position and longitudinally guide the deflected product Pn, in particular when it leaves the final position B.

The final position B of each deflected product Pn, and the position of the second queue F2 relative to the first queue F1, are capable of being modified for each application and are determined according to the main parameters of the phaser 22, in particular the length of the belt 30 corresponding generally to the center-to-center distance A1-A2 and the position of the cams 26, 28.

In the first exemplary application, the first queue F1 and the second queue F2 are transversally separated from each other by a determined separation distance "e", represented in FIG. 6.

Advantageously, the belt 30 temporarily ceases to be driven (passive state) for a determined duration which corresponds to the time needed for the deflected product P1 no longer to be transversally in contact with the lateral deflection face 42 of the cam 26.

Preferably, the belt 30 is then again controlled in its active state and driven by the servomotor 40 to displace the first cam 26 from its second engaged position to the other retracted position, called return position.

As a variant, the belt 30 is again controlled in its active state and driven by the servomotor 40 to displace the first cam 26 from its second engaged position directly to the retracted waiting position or the first engaged position.

By default, the switching-over of the first cam 26 from its second engaged position to its retracted return position is advantageously effected in a manner similar to the engagement switchover described previously between the retracted waiting position and the first engaged position.

The switching-over of the first cam 26 successively comprises a disengagement phase ph3 during which the cam 26 preferably undergoes an acceleration so as to be displaced from its second engaged position to an intermediate disengagement position.

Then, a so-called deceleration phase ph4 takes place during which the cam 26 is displaced from this intermediate disengagement position to its retracted return position, which is similar to that in which the second cam 28 was initially located in FIG. 1.

During the displacement of the first cam 26 on the bottom strand 38 of the belt from its retracted waiting position (FIG. 1) to its retracted return position (FIG. 5), the second cam 28 is simultaneously displaced in the opposite direction on the top strand from its retracted return position (FIG. 1) to the retracted waiting position (FIG. 5).

When the second cam 28 reaches the retracted waiting position, the phaser 22 is then ready to deflect the product Pn in the first queue F1 according to the determined distribution sequence, or in this case the third product P3.

When the third product P3 passes in front of the sensor 44, a detection signal is again transmitted to control the rotation-wise driving of the servomotor 40.

As previously for the first cam 26, the belt 30 is driven by the servomotor 40 which is controlled thanks to the sensor 44, the second cam 28 is therefore displaced synchronously to reach its first engaged position when the third product P3 reaches the initial position A.

As illustrated in FIG. 6, the second cam 28 is then displaced successively between the engaged and retracted positions according to a cycle that is identical to that which has just been described previously for the first cam 26 and so as to deflect the third product P3 of the first queue F1 to the second queue F2 already comprising the first product P1 deflected by the first cam 26 during the preceding cycle.

It can be seen that, at the exit from the phaser 22, the value of the downstream spacing E'2 between the first deflected product P1 and the third deflected product P3 of the second queue F2 and the value of the downstream spacing E2 between the undeflected second product P2 and the undeflected fourth product P4 of the first queue F1 are in this case equal.

Therefore, as will be understood, this equidistance between the products of the first and the second queue F1 and F2 is due to the particular distribution sequence and to the determined deflection speed V2 chosen for this first exemplary application.

The first and second queues F1 and F2 are phase-shifted relative to each other and longitudinally present a downstream spacing E between two successive products belonging respectively to each of the queues F1, F2, which downstream spacing is in this case equal to the upstream spacing E1.

FIG. 7 represents a second embodiment of the phaser, the refined phaser 23 notably being capable of being implemented in an arrangement 10 according to the invention of the type of that described previously for the first exemplary application.

Hereinafter, only the second embodiment of the phaser will be described, by comparison with the first embodiment.

The refined phaser 23 is mainly differentiated from the latter by the fact that it comprises two similar belts 50, 52 arranged in parallel, and by the fact that each belt 50, 52 is wound around a third pulley 54 which is arranged above the associated bottom strand 38 and above the associated upstream pulley 34 and downstream pulley 36.

The first belt 50 and the second belt 52 are arranged side by side, substantially symmetrically relative to a vertical plane comprising the main axis X of the phaser 23.

The axis X of the phaser 23 is inclined by an angle θ relative to the longitudinal direction of the belt 12 so that the phaser 23 is positioned obliquely downstream relative to the first queue F1 of products Pn.

Advantageously, the first belt 50 and the second belt 52 are driven independently, respectively by a first servomotor 56 and a second servomotor 58.

Each belt 50, 52 here comprises a first cam 60, a second cam and a third cam (not visible in FIG. 7), which are evenly spaced along the belt 50, 52 and which are similar to the cams 26, 28 of the first embodiment.

It will be noted that the number of cams could be different, the important point being that there is always a cam in the upstream waiting position when a product Pn is detected by the sensor 44 and that there are not two cams simultaneously in the engaged position.

The cams here comprise additional waiting positions, relative to the positions described with reference to the first embodiment.

For example, considering the first belt 50, when the first cam 60 occupies its retracted waiting position and the second cam occupies its retracted return position, then the third cam occupies a retracted median position, situated mid-way between the retracted waiting position and the retracted return position, in the vicinity of the third pulley 54.

Thus, the first cam 60 of the second belt 52 occupies a retracted waiting position offset by a few degrees of rotation angle of the upstream pulley 34, relative to the retracted waiting position of the first cam 60 of the first belt 50.

Similarly, the other two cams of the second belt 52 are offset relative to the corresponding cams of the first belt 50.

Advantageously, any risk of crossing-over between the cams of each of the belts 50, 52 is thus avoided.

As a variant, the cams of the belts 50, 52 are arranged without offset of a few degrees of rotation angle and each belt 50, 52 is controlled selectively.

According to this variant, the phaser 23 then operates in a way similar to a phasing device comprising two phasers similar to the phaser 22 described previously operating independently of one another according to the detection of the products so as to activate one and/or the other of the servomotors 56, 58.

The principle of operation of the second embodiment of the phaser 23, which is similar to that of the phaser 22, but which advantageously makes it possible to treat a flow of products Pn at a higher, faster rate, is described below.

In effect, the presence of a second belt 52 makes it possible to begin to deflect another product Pn before the first product P1 has been released in the final position B by one of the cams of the first belt 50.

In FIG. 7, the phaser 23 is represented in the passive state, the cams 60 occupying the retracted waiting positions described previously.

When it detects a first product P1, the detection signal emitted by the sensor 44 provokes the passage of the first belt 50 of the phaser 23 from its passive state to its active state.

The first servomotor 56 is started up so that the first cam 60 of the first belt 50 passes from its retracted waiting position to its first engaged position in which it comes into contact with the product P1 to be deflected and with which it continues its displacement until it reaches its second engaged position.

Shortly after the first servomotor 56 is started up, or at the same time, the second servomotor 58 is also started up, until the first cam 60 of the second belt 52 occupies its retracted waiting position.

Immediately the first cam 60 of the second belt 52 reaches its retracted waiting position, the second servomotor 58 is stopped, pending the arrival of a third product P3, whereas the first belt 50 is, for example, still driven.

The second product P2, situated immediately upstream of the first product P1, continues its longitudinal displacement in the first queue F1 without being deflected, according to the staggered distribution sequence of one product out of two.

Shortly before the first cam 60 is retracted from the first belt 50, the sensor 44 detects the arrival of a third product P3, which triggers the starting up of the second servomotor 58, the second belt 52 passing from the passive state to the active state.

The first cam 60 of the second belt 52 then occupies a first engaged position at the same time as the third product comes into its initial position A so as to transversally deflect said third product P3.

The phaser 23 consequently forms a second queue F2 which, parallel to the first queue F1, consists of the products Pn deflected by the cams of one 50 or the other 52 of the belts according to said distribution sequence.

The first product P1 having reached its final position B, the first cam 60 of the first belt 50 is then retracted and occupies its retracted return position, whereas the associated third cam occupies its retracted waiting position, then the first servomotor 56 is stopped.

The first belt 50 having returned to its initial passive state characterized by the positioning of one of its three cams in the retracted waiting position, the first belt 50 of the phaser 23 is again ready to deflect one of the subsequent products Pn that will have been detected by the sensor 44.

Advantageously, the first cam 60 of the second belt 52 simultaneously continues its transversal deflection displacement of the third product P3 from its initial position A to its final position B in the second queue F2, as previously the first cam 60 of the first belt 50 with the first product P1.

The cycle that has just been described is thus repeated for each cam of each belt 50, 52, according to the arrival of the products Pn and according to the determined distribution sequence.

There now follows more particularly a description of some advantageous characteristics of the second embodiment of the phaser 23.

Preferably, the internal surface 68 of the belts 50, 52 is toothed to cooperate with complementary transversal teeth borne by the axial driving surface 70 of the pulleys 34, 36, 54.

The phaser 23 is in this case borne by a frame in the form of a gantry 72 which rests, for example, on the ground (not represented) and which is advantageously mounted to move relative to the belt 12.

It will be noted that the mounting of the phaser 23 on a gantry 72 makes it possible to easily arrange it above any conveyor belt 12, and makes it possible to easily choose the longitudinal position and the angle $\theta$ of inclination downstream to set them.

The gantry 72 comprises, either side of the belt 12, two vertical longitudinal plates 74, 76 which respectively support the pulleys 34, 36, 54 associated with the first belt 50 and the pulleys 34, 36, 54 associated with the second belt 52.

Advantageously, the phaser 23 comprises means 78 for adjusting the center-to-center distance A1-A2 between the upstream pulley 34 and the downstream pulley 36 of each belt 50, 52.

The adjustment of the center-to-center distance A1-A2 makes it possible in particular to adapt the length of the bottom strand 38 of each belt 50, 52 to the upstream spacing E1 between the products Pn and to the longitudinal dimension of the products Pn.

According to the embodiment represented here, the axis A1 of each upstream pulley 34 is borne by a sliding block 80 which moves translation-wise on a rail 82 fixed to the associated support plate 74, 76.

The longitudinal displacement of each sliding block 80 is here controlled by an adjusting screw 84 fixed to the associated support plate 74, 76.

Advantageously, the phaser 23 comprises means 86 for taking up the tension of each belt 50, 52.

These means 86 comprise, for example, a vertical rail and sliding block system (not represented) making it possible to displace the axis A3 of the third pulley 54 vertically translation-wise, relative to the associated support plate 74, 76.

The means 86 of taking up the tension can operate automatically, for example by means of an elastic device which vertically stresses the axis A3 of the third pulley 54 upward.

According to another advantageous characteristic of the arrangement 10 according to the invention, a device 88 for ejecting products Pn is arranged between the sensor 44 and the phaser 22 or 23, so as to prevent certain malfunctions, in particular those due to upstream spacings E1 that are too short, that is less than the minimum set-point value.

More specifically, the minimum set-point value is determined so as to enable the distribution device 16 formed by the phaser 22 or 23 to position at least one cam in the retracted waiting position when a product Pn to be deflected is detected.

The ejection device 88 comprises, for example, means (not represented) for producing a jet of compressed air capable of ejecting a product Pn off the belt 12.

The ejection device 88 is controlled according to the detection signal produced by the sensor 44 so that, when the latter detects the arrival of an upstream product Pn that is too close to the product Pn situated immediately in front of it downstream, the ejection device 88 preferably provokes the ejection of the upstream product Pn off the belt 12.

In the first exemplary application that has just been described, the arrangement 10 comprises a phaser 22, 23 suitable for deflecting a portion of the products from a first queue F1 in order to split it so as to form a second queue F2 parallel to the first queue F1.

It will be understood that it is possible to obtain a third queue parallel to the second queue by having, for example, a second phaser downstream of the first phaser designed to form the second queue to form, in a similar manner with this second phaser and from products deflected from the second queue, said third queue of products.

Advantageously, the first upstream phaser and the second downstream phaser are arranged longitudinally one alongside the other between the entry area 18 and the exit area 20 of the belt 12.

Preferably, the first upstream phaser then deflects out of the first queue F1 more than one product out of two, for example two products out of three, so that one of these two products deflected into the second queue F2 is subsequently deflected in turn by the second downstream phaser into the third queue F3.

The arrangement according to the invention consequently makes it possible to proceed at least with one splitting of a queue of products Pn.

There are many possible implementations of such an arrangement making it possible to form a second queue F2 of products from a first queue F1 by dividing up between them the products Pn according to a determined distribution sequence.

There follows hereinbelow a description of a preferred exemplary implementation of an arrangement according to the invention in a product packaging installation 90.

An arrangement 10 according to the invention of the type of that described previously in FIGS. 1 to 6 advantageously consists of a first section T1 of such an installation 90 comprising a distribution device, such as a phaser 22 or a refined phaser 23, according to one of the embodiments described previously.

In such a packaging installation 90, the queue-splitting obtained thanks to the invention makes it possible advantageously to form batches, in particular batches comprising at least two products one alongside the other, or to prepare the products for the formation of such batches.

Figure 8:
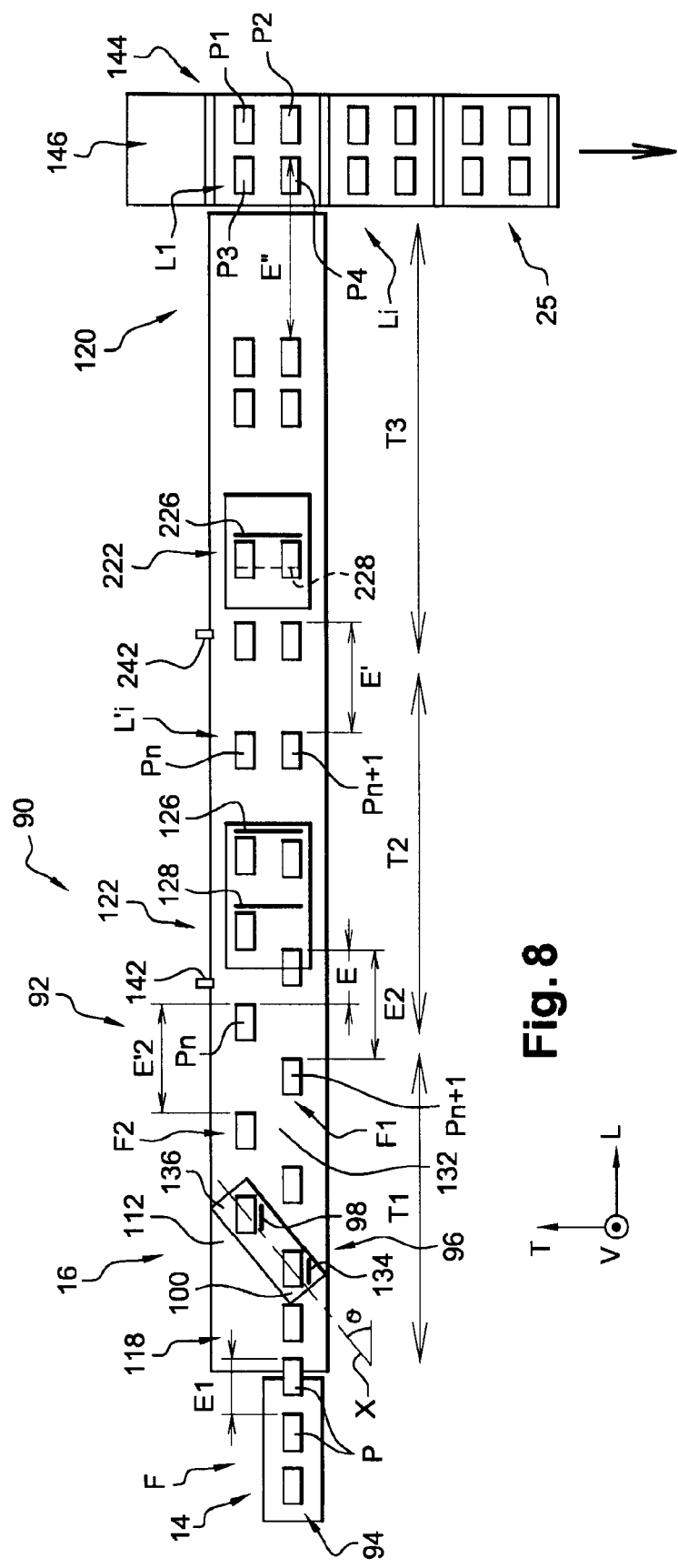
FIG. 8 is a top view which represents a preferred exemplary implementation of an arrangement comprising a distribution device according to the invention in a product packaging installation.

The product packaging installation 90 represented in FIG. 8 is more particularly designed to group the products into batches L1, in particular in order to route said batches of products to a crating machine (not represented).

A packaging installation 90 of this type comprises a conveyor line 92 which extends longitudinally along a conveyor belt 112 on which run from upstream to downstream the products P to be routed.

The installation 90 comprises, in turn from upstream to downstream, a device 14 for supplying the conveyor line 92 with products, a device 16 for distributing the products produced in accordance with the teachings of the invention, a device for grouping products into batches Li comprising at least first phasing means 122 and second phasing means 222.

In this example, the batches Li comprise four products P which are grouped so as to be inscribed overall in a square, that is a batch Li formed respectively of two rows of two products or even two columns of two products.

The feed device 14 here comprises a feed belt 94 which routes a queue F of products P separated longitudinally by an upstream spacing E1 to an entry area 118 of the conveyor belt 112.

It will be noted that, by comparison, the upstream spacing E1 corresponds to the upstream spacing designated E1 in the description of the first exemplary application of FIGS. 1 to 6.

A distribution device 16 is arranged, downstream of the entry area 118, on said first upstream section T1 of the conveyor belt 112 to distribute the products P of the queue F on the top face 132 of the belt 112 according to a determined distribution sequence.

Advantageously, the distribution device 16 comprises a phaser 96 comprising at least one cam, in this case two cams 98, 100, and which is arranged relative to the belt 112 so as to distribute the products P of the queue F in order to split it to respectively form downstream a second queue F2 of products P, designated hereinafter Pn, which is parallel to a first queue F1 of products P, designated hereinafter Pn+1, which here corresponds to the upstream queue F.

The phaser 96 is, for example, similar to the phaser 22 described in the first embodiment and represented in FIGS. 1 to 6, so that the phaser 96 is characterized on the one hand by its oblique position relative to the longitudinal running direction of the belt 112 and, on the other hand, by the position of the cams 98, 100 which are displaced transversally, here from right to left, at a speed with a longitudinal component VL equal to the running speed of the belt 112.

As a variant, the phaser 96 is a phaser similar to the refined phaser 23 described previously and represented in FIG. 7.

Advantageously, the phaser 96 comprises, to drive the cams 98, 100, a belt which is wound between a first right-hand pulley 134 and a second left-hand pulley 136 respectively of rotation axis A1 and A2.

A main axis X of the phaser 96 is defined as being the median axis which is orthogonal to the axes A1 and A2 of the pulleys and contained in a horizontal plane parallel to the belt of the phaser.

The oblique position of the phaser 96 is defined by the main axis X of which the intersection with the longitudinal running direction of the belt 112 forms an acute angle θ which is advantageously between 0° and 90°, for example equal to 45°.

The two pulleys are arranged above the belt 112 so that the bottom strand of the belt extends substantially parallel to the top face 132 of the belt 112 and so that the cams 98, 100 extend parallel to the longitudinal running direction of the belt 112, that is with a determined angle θ relative to the main axis X of the phaser 96.

The right-hand pulley is capable of being driven rotation-wise by means of a servomotor able selectively to drive the belt bearing the cams 98, 100 rotation-wise around pulleys in the same direction as the belt 112 and with a driving speed V2, called deflection speed, of the cams 98, 100 determined so that the longitudinal component VL of the driving speed is advantageously equal to the running speed V1 of the belt 112.

Advantageously, the product distribution sequence downstream of the phaser 96 is in this case similar to that represented previously, namely a staggered distribution with alternation of one product out of two, so as to form a second queue F2 parallel to the first queue F1.

Thus, the second queue F2 consists of deflected products Pn which are positioned with a spacing E'2 between two successive products P1, P3, P5, etc. and the first queue F1 consists of products Pn+1 positioned with a spacing E2 between two successive products P2, P4, P6, etc.

According to the staggered distribution sequence, the spacings E'2 and E2 of the queues F2 and F1 are in this case equal to each other.

The first and second queues F2 and F1 are phase-shifted relative to each other and present a spacing E between two successive products Pn, Pn+1 belonging respectively to each of the queues F2, F1, said spacing E here being equal to the upstream spacing E1.

The products Pn of the queue F2 and the products Pn+1 of the queue F1 distributed staggered in this way then travel a second intermediate section T2 of the belt 112 comprising the first phasing means consisting of a phaser 122.

Advantageously, the phaser 122 is structurally identical to one or other of the phasers 22, 23 described respectively in the first and second embodiments and therefore will not be described in detail hereinbelow.

The phaser 122 comprises a cam 126 and a cam 128 which are driven at a slowing-down speed V3 by a servomotor, the starting-up of which is advantageously controlled according to the detection signal from a sensor 142.

The operation of the phaser 122 is similar such that, downstream of the phaser 122, the products Pn, Pn+1 of the queues F2 and F1 are grouped in rows so as to form batches L'i, called intermediate batches, respectively comprising a product Pn and a product Pn+1 grouped transversally one alongside the other.

The intermediate batches L'i then travel a third downstream section T3 of the belt 112 comprising second phasing means 222.

The second phasing means 222 are in this case designed to group two intermediate batches L'i made up previously by the first phasing means 122 to form a batch Li.

The second phasing means 222 comprise at least one phaser, preferably identical to one or other of the phasers 22, 23 described respectively in the first and second embodiments, or even as described in the abovementioned patent application FR No. 0550528 to which reference can be made for more comprehensive details.

The phaser 222 is arranged above the belt 112 and it is centered relative to the queues F1 and F2.

The phaser 222 comprises respectively at least one first cam 226 and a second cam 228, for example similar to the cams 26, 28 of the phaser 22.

When the products P1, P2 forming the first intermediate batch L'i arrive in front, they are advantageously detected by detection means, such as a sensor 242, which synchronously control the starting-up of the servomotor of the phaser 222.

The first cam 226 then passes from an upstream waiting position (passive state) to an engaged position (active state) in which each is driven longitudinally forward by the servomotor at a slowing-down speed V4.

Since the slowing-down speed V4 is less than the running speed V1, the first product P1 and the second product P2 forming the first intermediate batch L'1 meet the cam 226 of the phaser 222 and abut against upstream transversal face of the latter.

The speed difference between the running speed V1 and the slowing-down speed V4 of the cams 226, 228 consequently provokes a slipping of the products P1, P2 on the belt 112 until said cam 226 reaches its retracted position.

The first product P1 and the second product P2 are then progressively joined by the products P3 and P4 of the next intermediate batch L'i, respectively belonging to the second and first queues F2, F1 and which, downstream of the phaser 122 and upstream of the phaser 222, are initially separated by a spacing E' which is equal to the upstream spacing E2 between the products Pn+1 of the first queue F1.

In effect, the spacing E' between products P1 and P2 of the batch L'1 on the one hand and the products P3 and P4 of the batch L'2 on the other hand will progressively diminish under the phaser 222 to reach a determined non-zero value, the products P1 and P2 being advantageously released before the products P3 and P4 come into contact with them.

A final batch L1 is thus formed, here comprising four products P1, P2, P3 and P4 which are grouped two by two in rows and in columns.

Advantageously, in the exit area 120 of the belt 112 situated downstream of the phaser 222, the downstream spacing E" between two batches Li is substantially equal to twice the spacing value E' between the intermediate batches L'i.

Advantageously, the packaging installation 90 comprises in succession first phasing means 122 and second phasing means 222 when the difference between the running speed V1 of the belt and the slowing-down speeds of the phasing means required in order to form the batches L'i or Li is great, for example when the running speed V1 is two times greater than the necessary slowing-down speed.

As a variant, the packaging installation 90 comprises only first phasing means 122, the characteristics of which like the length of the belt, the position of the cams or even the slowing-down speed V2, are determined so that the grouping in rows of the first and second products P1, P2 then the grouping of the subsequent products P3 and P4 are done under the bottom strand of the phaser 122.

The packaging installation 90 comprises, downstream of the exit area 120 of the conveyor belt 112, a grouper 25 comprising a train 144 of cells 146 which moves in the transversal direction, and the cells 146 of which are open towards the belt 112.

The first batch L1 fills one of the empty cells 146, then the train 144 is shifted by one cell to receive the next batch L2 in order for the batches Li of products to be, for example, routed by the grouper 25 to a crating machine.

As illustrated by the packaging installation that has just been described, a phaser of the type of the phasers 22 or 23 according to one of the embodiments is capable of being implemented to provide different functions according to the applications.

Thus, the function of the phaser 22 or 23, in the arrangement according to the invention of the first section T1 of the installation 90, is to deflect at least a portion of the products of one queue to form another parallel queue, so the function is then said to form two queues, whereas it provides another function in the sections T2 or T3 of the installation.

In effect, the function of the phaser 22 or 23 is then to selectively slow down at least one determined product in order to align the products transversally in rows and/or longitudinally in columns so as, in the exemplary packaging installation 90, to form batches of products designed to be collected by a grouper in order to then be crated.

However, it should be understood that the use of a phaser to make up batches of products is only one possible exemplary application.

In effect, such a phaser is also capable of being implemented in an installation of the type of the installation 90 to balance at least one queue of products in which two products are separated by a determined spacing.

By definition, the term "balancing" a queue of products should be understood to mean the use of the phaser to slow down at least one given product in order for the spacing between two successive products of this queue to be in particular greater than or equal to a minimum set-point value.

In the packaging installation 90, such a minimum set-point spacing value between two products arranged one behind the other or one alongside the other corresponds, for example, advantageously to the time needed for at least one of the cells of the grouper to be displaced by one notch and for a new empty cell to be presented facing the belt.

Obviously, the grouper 25 with cells is only one possible and non-limiting example of a product grouping device that is capable of being implemented in an installation, such as the packaging installation 90.

As a variant, the grouping device consists of a robot or robotized arm provided at its free end with gripping means such as clamps or suckers so as to take the products grouped or distributed according to a determined sequence, for example in batches.

Advantageously, the products are taken dynamically by such a robot, that is, without stopping or slowing down the conveyor belt, and the taking is performed in the exit area of the belt.

Advantageously, such a robotized grouping device is capable of directly handling the operation for crating a product or a batch of products.

According to a variant embodiment of FIG. 8 (not represented), the second section T2 of the belt 112 consists of two belts parallel to each other, respectively a first and a second belt that are longitudinally aligned with each of the queues F1 and F2.

The products P of the queue F that are not deflected by the phaser 96 continue their displacement from upstream to downstream and these products Pn+1 forming the first queue F1 are conveyed by the first belt which is driven at a running speed V1 identical to that of the belt 112 of the sections T1 and T3.

The products P of the queue F that are deflected by the phaser 96 to form the second queue F2 of product Pn are on the other hand conveyed by the second belt between the first section T1 and the third section T3.

According to this variant, the choice of an appropriate value for the running speed V'1 of this second belt relative to the speed makes it possible to vary the value of the spacing E, that is, the spacing between a product Pn of the second queue F2 and a product Pn+1 of the first queue F1.

From an initial flow of product P, the spacing E1 of which is determined and constant, it is thus possible, with a driving speed V'1 of the second belt less than the driving speed V1 of the first belt, to reduce the spacing value E to a zero value for which the products Pn of the second queue F2 are transversally aligned alongside the products Pn+1 of the first queue F1.

Advantageously, the implementation of such a variant embodiment in the packaging installation 90 of the type of that of FIG. 8 makes it possible to eliminate the first phaser 122 and handle, in the same way, the grouping function for the products Pn, Pn+1 of the queues F1 and F2 on one and the same row, transversally one alongside the other to form the intermediate batches L'i.

FIG. 9 diagrammatically represents an arrangement 10' according to a second exemplary application of the invention comprising a distribution device 16 which can consist of a phaser 22 according to the first embodiment or a phaser 23 according to the second embodiment.

This second exemplary application will be described hereinafter by comparison with the first exemplary application represented in FIGS. 1 to 6.

According to the invention, the arrangement 10' is characterized in that the distribution device 16 consists of a phaser 22, 23 which is arranged between the entry area 18 and the exit area 20 and which is positioned obliquely relative to the belt 12, or with an inclination forward of angle θ relative to the longitudinal direction.

The phaser 22, 23 comprises at least one cam 26' which is driven at a deflection speed V2 and which is controlled, according to a determined distribution sequence, in order to come selectively into contact with at least one product Pn of the first queue F1.

According to the second exemplary application, the cam 26' is capable of laterally deflecting the product Pn from an initial position A to a determined final position B which is transversally offset relative to the initial position A.

In the arrangement 10', the phaser 22, 23 is designed to deflect the products from the first queue F1 to form a second queue F2 of products Pn which is in this case orthogonal to the first queue F1.

Advantageously, the second queue F2 of deflected products Pn is formed on another belt 46 which is arranged orthogonally to the exit area 20 of the belt 12 and which is driven transversally, from bottom to top in FIG. 9, at a running speed V'1.

As a variant, the belt 46 is arranged with an angle different to 90°, the angle being determined by the direction to which the products are to be reoriented.

The determined distribution sequence corresponds in this second example to an application, called return application, in which all the products Pn of the first queue F1 are deflected laterally so as to be displaced on the top face of the other conveyor belt 46.

As a variant, at least a portion of the products Pn, such as products previously identified as being nonconforming by an inspection device, is not deflected by the phaser 22, 23 to the other belt 26 so as to be selectively eliminated to recovery means (not represented) arranged, for example, at the end of the exit area 20 of the belt 12.

FIG. 9 more particularly represents a distribution sequence in which all the products Pn are deflected at 90° from the first queue F1 to the second queue F2 orthogonal to the first queue F1.

Advantageously, a change of orientation of the deflected products Pn is performed here simultaneously with the deflection of the products Pn from the first queue F1 of the belt 12 to the second queue F2 of the belt 46.

In the example represented in FIG. 9, the running speed V1 of the belt 12 and the running speed V'1 of the other belt 46 are preferably equal and the angle θ has a value of 45° in order to retain the rate.

Preferably, the belt 30, 50, 52 is therefore driven at a determined deflection speed V2 so that the longitudinal driving speed VL of the cam 26' is equal to the running speed V1.

Consequently, the deflected products Pn are not subjected to any slowing down and always retain a constant speed making it possible to achieve high speeds with such an arrangement 10'.

The value of the angle θ is preferably between 0 and 900, for example equal to 30°, 45° or 60°.

Advantageously, the value of the running speed V'1 makes it possible to vary the spacing between the deflected products Pn of the second queue F2, therefore if the running speed V'1 is greater the spacing E2 between the products will increase whereas if it is less the spacing E2 will reduce.

Thus, the value of the running speed V'1 of the belt 46 makes it possible to modulate the spacing between the deflected products Pn of the second queue F2.

FIG. 9 represents a phaser 22 comprising a first cam 26' and a second cam 28' which are distributed opposite one another on the belt 30 which is driven by a servomotor advantageously controlled through the intermediary of the sensor 44.

The operation of the phaser 22 is similar to that described previously for the first exemplary application, and it will not be described in detail hereinbelow.

According to a variant embodiment (not represented), the arrangement 10' of FIG. 9 comprises another belt 46 which is arranged parallel to the conveyor belt 12.

Preferably, the second belt 46 is then arranged so that its entry area extends transversally facing the exit area of the belt 12, that is parallel alongside the exit area of the belt 12.

As a variant, the entry area of the second belt 46 is arranged at the end of the exit area of the belt 12, that is longitudinally facing in the extension of the latter.

Thus, the choice of an appropriate value of the driving speed V'1 of the belt 46 makes it possible to act on the value of the spacing between the products Pn, that is, on the final value, after deflection by the phaser 22, of the spacing between a product Pn and a product Pn–1 situated immediately upstream.

According to this variant, the deflection of the products Pn of the first queue F1 of the belt 12 to the second queue F2 of the belt 46 is performed without change of orientation of the products Pn deflected in this way.

The invention claimed is:

1. An arrangement (10) for the distribution of products (Pn), in which the products (Pn) are transported on a conveyor belt (16) which runs in a longitudinal direction, from an upstream entry area (18) to a downstream exit area (20), at a determined so-called running speed (V1), in which the products (Pn) form, in the entry area (18), at least one longitudinal queue, called first queue (F1), with a determined upstream spacing (E1) between two successive products (Pn), and which comprises at least one distribution device (16), called deflector, consisting of a phaser (22, 23) which, arranged between the entry area (18) and the exit area (20) on the path of the products (Pn), is designed to deflect at least a portion of the products (Pn) according to a determined distribution sequence, the phaser (22, 23) comprising at least one cam (26) which is driven at a deflection speed (V2) and which is able to come into contact with at least one product (Pn) of the first queue (F1) to laterally deflect said product (Pn) from an initial position (A) to a determined final position (B), transversally offset relative to the initial position (A), so as to form at least one second queue (F2) of products (Pn), characterized in that the phaser (22, 23) comprises a first (50) and a second (52) similar belt which are arranged in parallel and which are driven independently, and in that each belt (50, 52) is controlled in an active operating state before the end of the active state of the other belt (50, 52), so that the deflection of a product (Pn) begins before the previously deflected downstream product (Pn) has reached its final position (B) in the second queue (F2).

2. The arrangement (10) as claimed in claim 1, characterized in that the phaser (22, 23) is selectively controlled, according to said distribution sequence, in order for the cam (26) to occupy at least:

a first engaged position in which the cam (26) comes laterally into contact with the product (Pn) occupying the initial position (A) so as to transversally deflect said product (Pn) from the first queue (F1), and a second engaged position in which, said deflected product (Pn) occupying the final position (B) in the second queue (F2), the cam (26) is immobilized so as to enable the deflected product (Pn) to continue its movement.

3. The arrangement (10) as claimed in claim 2, characterized in that each drive belt (30, 50, 52) of the phaser (22, 23) bears at least one cam (26, 28, 60) and is arranged alongside the top face (24) of the belt (12), in that each belt (30, 50, 52) is wound on at least two drive pulleys (34, 36, 54) so that a bottom strand (38) of the belt (30, 50, 52) extends substantially parallel to the top face (24) of the belt (12), the cam (26, 28, 60) occupying the first and second engaged positions when it is situated on the bottom strand (38), and in that the phaser (22, 23) comprises means (40, 56, 58) for driving the pulleys (34, 36, 54) rotation-wise at the determined deflection speed (V2).

4. The arrangement (10) as claimed in claim 3, characterized in that the phaser (22, 23) comprises a main axis (X) parallel to the belt (30, 50, 52) which is inclined forward so as to form, with the longitudinal running direction of the products (Pn) on the conveyor belt (12), a determined angle ($\theta$) the value of which is between 0° and 90°.

5. The arrangement (10) as claimed in claim 4, characterized in that the cam (26, 28, 60) is positioned on the belt (30, 50, 52) so as to vertically present a lateral deflection face (42), which is designed to come into contact with the product (Pn) to be deflected and which extends parallel to the longitudinal running direction of the products (Pn) of the first queue (F1) on the conveyor belt (12).

6. The arrangement (10) as claimed in claim 5, characterized in that the cam (26, 28, 60) is controlled from its second engaged position to at least one retracted waiting position, when having reached its final position (B) in the second queue (F2), the deflected product (Pn) is no longer transversally in contact with the lateral deflection face (42) of the cam (26, 28, 60).

7. The arrangement (10) as claimed in claim 6, characterized in that the belt (30, 50, 52) comprises a passive operating state in which it is stopped, each cam (26, 28, 60) occupying the second engaged position or the retracted waiting position and said active operating state in which the belt (30, 50, 52) is driven rotation-wise around the pulleys (34, 36, 54) so that a cam (26, 28, 60) is moved generally transversally from the retracted waiting position to the second engaged position or from the second engaged position to the retracted waiting position.

8. The arrangement (10) as claimed in claim 7, characterized in that the belt (30, 50, 52) is controlled in its active state through the intermediary of detection means (44), such as a sensor, positioned upstream of the phaser (22, 23) and able to supply a detection signal for a product (Pn) which can be used according to the determined distribution sequence to deflect the products (Pn) to the second queue (F2).

9. The arrangement (10) as claimed in claim 7, characterized in that, when the two belts (50, 52) are in the passive state, the retracted positions of the cams (60) of the first belt (50) are offset relative to the retracted positions of the cams (60) of the second belt (52), so as to prevent crossing of the cams (60) of the two belts (50, 52) and in that each belt (30, 50, 52) bears at least two similar cams (26, 28, 60) which are evenly spaced along the belt (30, 50, 52) so that, for each belt (30, 50, 52), just one cam (26, 28, 60) at a time can occupy the first engaged position.

10. The arrangement (10) as claimed in claim 1, characterized in that the second queue (F2) comprising the deflected products (Pn) is parallel to the first queue (F1).

11. The arrangement (10) as claimed in claim 1, characterized in that, in the engaged position, the belt (30, 50, 52) is driven at a determined deflection speed (V2) so that a longitudinal driving speed (VL) of the cam (26, 28, 60) is equal to the running speed (V1).

12. The arrangement (10) as claimed in claim 1, characterized in that the second queue (F2) comprising the deflected products (Pn) is orthogonal to the first queue (F1).

13. The arrangement (10) as claimed in claim 8, characterized in that, when the two belts (50, 52) are in the passive state, the retracted positions of the cams (60) of the first belt (50) are offset relative to the retracted positions of the cams (60) of the second belt (52), so as to prevent crossing of the cams (60) of the two belts (50, 52) and in that each belt (30, 50, 52) bears at least two similar cams (26, 28, 60) which are evenly spaced along the belt (30, 50, 52) so that, for each belt (30, 50, 52), just one cam (26, 28, 60) at a time can occupy the first engaged position.

14. The arrangement (10) as claimed in claim 2, characterized in that the second queue (F2) comprising the deflected products (Pn) is parallel to the first queue (F1).

15. The arrangement (10) as claimed in claim 3, characterized in that the second queue (F2) comprising the deflected products (Pn) is parallel to the first queue (F1).

16. The arrangement (10) as claimed in claim 4, characterized in that the second queue (F2) comprising the deflected products (Pn) is parallel to the first queue (F1).

17. The arrangement (10) as claimed in claim 5, characterized in that the second queue (F2) comprising the deflected products (Pn) is parallel to the first queue (F1).

18. The arrangement (10) as claimed in claim 6, characterized in that the second queue (F2) comprising the deflected products (Pn) is parallel to the first queue (F1).

19. The arrangement (10) as claimed in claim 7, characterized in that the second queue (F2) comprising the deflected products (Pn) is parallel to the first queue (F1).

20. The arrangement (10) as claimed in claim 8, characterized in that the second queue (F2) comprising the deflected products (Pn) is parallel to the first queue (F1).

* * * * *